April 14, 1970    E. JAEGER    3,505,992

ERGOMETER

Filed Nov. 24, 1965    2 Sheets-Sheet 1

Inventor:
Erich Jaeger
by Stephen H. Frishauf
Atty

Inventor:
Erich Jaeger

United States Patent Office 3,505,992
Patented Apr. 14, 1970

3,505,992
ERGOMETER
Erich Jaeger, 5 Rontgenring, Wurzburg, Germany
Filed Nov. 24, 1965, Ser. No. 509,565
Claims priority, application Germany, Nov. 25, 1964,
J 26,980
Int. Cl. A61b 5/10
U.S. Cl. 128—2         6 Claims

ABSTRACT OF THE DISCLOSURE

A circuit for an ergometer adapted to be driven by a person includes a generator, driven by a mechanical transmission which has losses; in order to compensate for losses, the generator power supply includes a speed sensitive device such as a tachometer (5) the output of which is connected to a compensating circuit (15) having a transfer function approximately corresponding to the square root of the speed, the regulating circuit maintaining the sum of the voltage across the load, as derived from the generator, and the voltage proportional to the root of the speed, substantially constant.

The invention relates to an ergometer, that is to say a medical apparatus which enables a person who is to be examined to be subjected to a definite physical strain. The invention relates in particular to a circuit arrangement for a so-called dynamo ergometer.

In the case of dynamo ergometers, the person to be examined drives an electric generator which is connected to a load, for example a resistor, in which the electric power generated is dissipated. It is known to employ regulating circuits which usually act on the field of the generator to keep the dissipated power constant at an adjustable value irrespective of the rotary speed, when a minimum speed has been exceeded. Therefore, the person to be examined can drive the dynamo at practically any speed that suits him or her without the power delivered being affected thereby.

In electrical respects the known circuit arrangements for power stabilisation of ergometers irrespective of speed operate in a satisfactory manner. However, the person examined must also produce frictional power apart from the dissipated electrical power, in order to overcome the unavoidable friction in the power transmission between the crank and the dynamo and in the various bearings. The mechanical frictional power is approximately proportional to the speed and the known electric stabilising circuits and cannot take into account this frictional power. In the known circuit arrangements, the electric power is usually indicated by a measuring instrument which measures the load voltage or the load current and is calibrated in units of power. Attempts have heretofore been made to take the frictional power into account, at any rate to a certain degree, by recalibrating the measuring instrument. This can naturally only represent a very inadequate compromise, since in the normal operating range of the apparatus generated electric power is in fact independent of the speed owing to the stabilising circuits and the proportion of frictional power is in the total power produced by the person under examination may therefore vary within wide limits.

It is the object of the present invention to overcome the indicated difficulties. Thus, a circuit arrangement for an ergometer is proposed in which the total power exerted by the person examined, and not merely as heretofore the electric power, is kept constant irrespective of the speed of the generator.

According to the invention, a circuit arrangement for an ergometer having a dynamoelectric generator (dynamo) which is driven by a person to be examined by means of a mechanical transmission and is connected to a regulating circuit for regulating the electric power supplied to a load resistor, is characterised in that the regulated circuit reduces the electric power supplied to the loading resistor by an amount proportional to the speed of the generator.

In a preferred embodiment of the invention, the regulating circuit keeps constant the sum of the voltage drop at the loading resistor and a compensation voltage which is proportional to the square root of the speed. The compensating voltage is preferably produced by a tachometer generator which is normally provided in such ergometers for speed indication purposes.

The invention will now be described more fully with reference to the accompanying drawing, in which.

Figure 1:
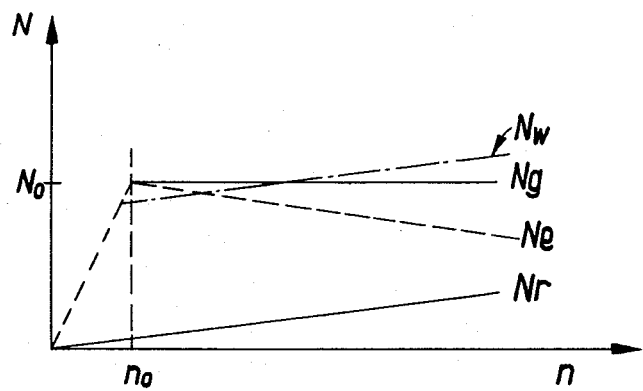
FIGURE 1 shows in a diagram the dependence of the different power components N on the driving speed $n$ of the ergometer.

In ergometric investigations, the strain on the person to be examined, that is the total power delivered to the ergometer, should remain constant at an adjusted value irrespective of the driving speed. In practice, this postulates a certain minimum speed $n_0$ and the total power should then in the ideal case, within the range of operation above $n_0$, correspond to the straight full line $N_g$ parallel to the abscissa. The total power is composed of two components which are independent of one another, namely the mechanical frictional power $N_r$ which is consumed in the transmission mechanism and the bearings and which is approximately proportional to the speed $n$, and the electric power, which is converted into heat in a load resistor connected to the electric generator of the ergometer. The ergometer circuit arrangements heretofore employed keep this electric power constant, so that the electric power has a trend in accordance with the curve $N_g$ in FIGURE 1. The true power produced by the person to be examined, however, follows a course in accordance with the curve chain dotted $N_w$, since only the electric power is kept constant by the known electric circuit arrangements. Of course, the friction component cannot be exactly determined by recalibration of the instrument indicating the electric power dissipated, (since in the range of regulation this component is independent of the adjusted electric power.

This drawback is removed by means of the invention in that the regulating circuit is so designed that the electric power received by the loading resistor is reduced by an amount proportional to the speed of the generator. In the circuit arrangement according to the invention, the electric power therefore follows a course in accordance with the straight broken line $N_e$ so that the sum $(N_e+N_r)$, that is the total power to be produced by the patient, is now really constant in the entire working range and corresponds to curve $N_g$.

Figure 2:
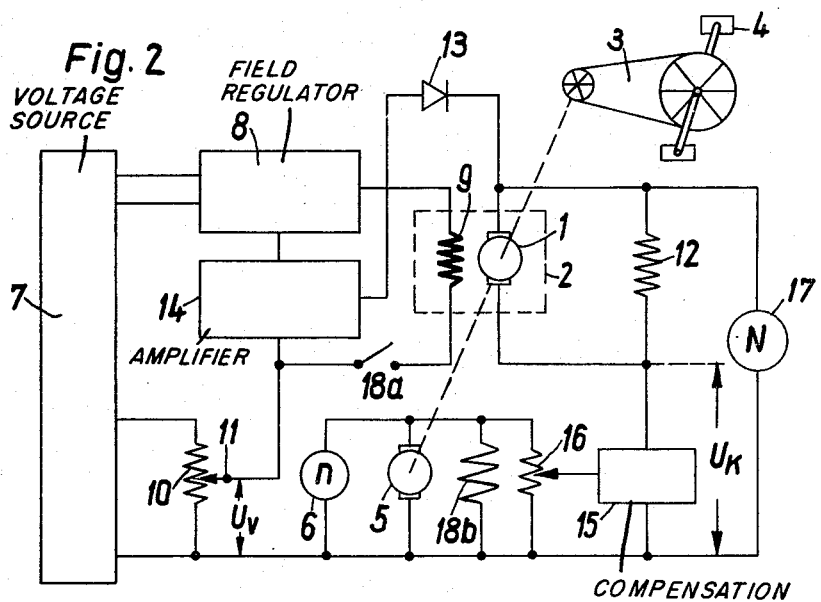
FIGURE 2 is a simplified block circuit diagram of an embodiment of the invention.

The invention can be carried into effect in various ways. The embodiment of the invention illustrated in FIGURE 2 is based on a known circuit arrangement with field current regulation. The armature 1 of a generator or dynamo 2 is connected through a mechanical transmission 3 to a hand-operated or foot-operated crank 4 to be actuated by the person to be examined. The dynamo (or the transmission) is moreover coupled to a tachometer generator 5 which delivers a speed-dependent voltage which is indicated by a voltage measuring instrument 6 calibrated in speed values. A voltage supply device or source 7 feeds a field regulator 8 to which a field winding 9 of the generator 2 is connected. At a sliding contact 11 thereof a potentiometer 10 is derived an adjustable reference voltage $U_v$ which determines the power value $N_0$ (FIGURE 1) kept constant by the regulating voltage. Connected to the armature 1 of the generator is a load resistor 12 in which the electric power produced by the generator 2 is converted into heat. One terminal of the armature 1 is connected by way of a switching diode 13 to an amplifier 14 connected to the regulating circuit 8. If the compensating stage 15, which will be described later, and the potentiometer 16 is disregarded, there is disposed in parallel with the load resistor 12 a voltage measuring instrument 17 which is calibrated in units of power and which is intended to indicate the power delivered by the patient. Except for the stage 15 and the potentiometer 16, the above described arrangement is known.

If the two last-mentioned components 15 and 16 are disregarded, the known circuit arrangement operates in the following manner: When the armature 1 of the generator 2 is stationary, the reference voltage $U_v$ is applied to the switching diode 13 as blocking voltage. The field current supplied to the field winding 9 by the field regulator 8 then has its maximum value. If the armature 1 is now rotated by way of the driving arrangement 3, 4 and the speed exceeds a certain value $n_0$, the armature voltage becomes greater than the reference voltage $U_v$, the diode 13 is biased in forward direction and begins to conduct and the field regulator 8 reduces the field current to such an extent that the armature voltage (except for the regulating deviation) is equal to the reference voltage. In the known arrangement, even with further increasing speeds, the armature voltage and thereby the electric power then remain constant. The frictional power $N_r$, however, and additionally produced by the patient varies in proportion to the speed.

In order to take the frictional power into account and keep the total power $N_g$, that is the electric power constant plus the frictional power, a compensating voltage, which is supplied by the stage 15, is connected in series with the armature voltage across the resistor 12, so that the field regulator now keeps the sum of the armature voltage and the compensating voltage constant. In the circuit arrangement according to the invention, this sum is indicated by the instrument 17. In the ideal case, the compensating voltage should be proportional to the square root of the speed, since the electric power converted into heat in the resistor 12 is proportional to the square of the armature voltage.

In the embodiment illustrated in FIGURE 2, the compensating voltage $U_k$ supplied by the stage 15 is derived from the speed-proportional voltage supplied by the tachometer generator 5. The stage 15 therefore includes a nonlinear element which produces from the speed-proportional voltage derived from the potentiometer 16 a compensating voltage $U_k$ which is at least approximately proportional to the root of the speed. The potentiometer 16 enables the proportionality factor to be adjusted and so to take into account the absolute value of the frictional resistance of the mechanical parts.

In practice, the tachometer generator 5 may be an alternative-voltage generator and the desired non-linearity may then be formed by a rectifier circuit and an appropriately designed amplifier. To a certain extent, the armature reaction in the generator 1 can also to be taken into consideration. Circuit arrangements with a square root characteristic are known per se.

Figure 3:
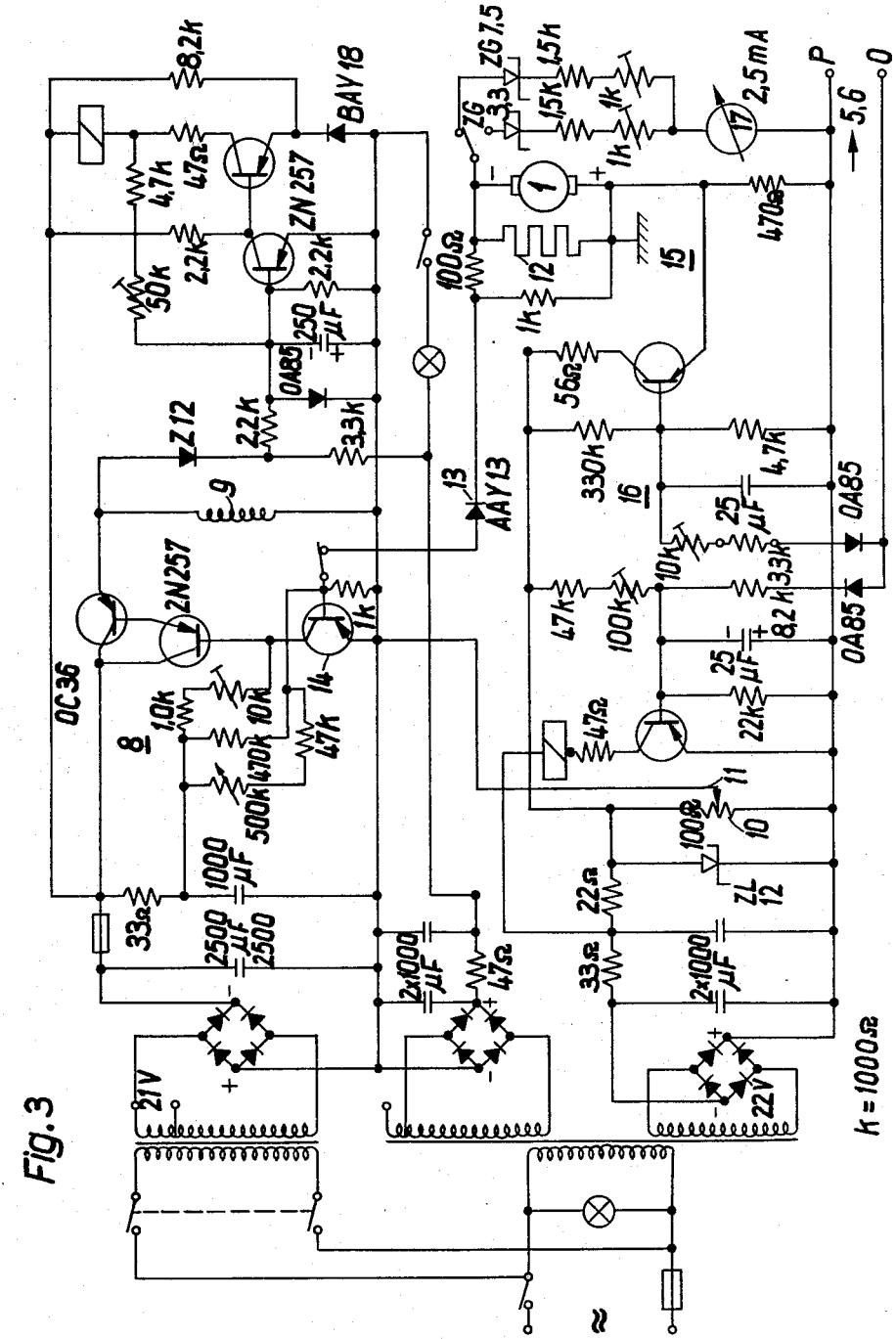
FIGURE 3 is a detailed circuit diagram of a preferred example of embodiment of the invention.

The detailed circuit diagram illustrated in FIGURE 3 corresponds to the block circuit diagram of FIGURE 2 and therefore the same reference numerals have been used for like parts. The circuit diagram can be immediately understood by the electronics engineer, so that a detailed description of this circuit diagram is unnecessary.

In the circuit arrangement described (FIGURES 2, 3) the field current decreases with increasing speed and is accordingly a maximum at zero speed. In view of the frequently unavoidable long waiting times between tests in a series of examinations, this may result in undesirable heating of the field winding and thereby of the generator arrangement. According to a further feature of the invention, in order to remove this drawback, a switch $18a$ is therefore connected in the circuit of the field winding 9 (FIGURE 2), which switch is controlled by a speed-sensitive device, for example an electronic or electromagnetic relay $18b$, illustrated only diagrammatically, which is advantageously connected to the tachometer generator 5. The field current is therefore interrupted as long as the speed is below a certain value, in practice, for example, below 5 to 10 revolutions per minute.

The embodiments which have been described may, of course, be modified in the most deverse ways within the scope of the invention. For instance the compensating voltage may be produced in some other manner. Instead of using voltage compensation, it is, of course, possible to operate in the same way with current compensation. In this case, a supplementary speed-dependent current is then caused to flow through the load resistor and the total current is kept constant.

What I claim as new and desire to secure by Letters Patent of the United States is:

1. In a circuit arrangement for an ergometer having means including a mechanical transmission in which mechanical friction losses occur, said means being adapted to be driven by a person to be examined, a generator driven by said transmission, a load resistor connected to said generator, means measuring the power supplied by said generator, and a regulating circuit connected to said generator to regulate the power supplied by said generator;

the improvement comprising
speed responsive means connected to said generator and having an output connected to said regulating circuit;
and compensating means in said regulating circuit responsive to said output to reduce the electric power supplied by the generator by an amount which is approximately proportional to the rotary speed of the generator and thus to said friction losses.

2. A circuit arrangement as claimed in claim 1 wherein said compensating circuit supplies a compensating voltage which is approximately proportional to the root of the speed, said regulating circuit maintaining constant the sum of the voltage supplied by said generator and said compensating voltage.

3. A circuit arrangement as claimed in claim 2 wherein the regulating circuit regulates the field current of the generator.

4. A circuit arrangement as claimed in claim 1, wherein said speed regulaing means comprises a tachometer generator which supplies a speed-proportional voltage, and said compensating circuit in the regulating circuit is controlled by a voltage derived from the output voltage of said tachometer generator.

5. A circuit arrangement as claimed in claim 4, wherein the tachometer generator is connected to a potentiometer from which a part of its output voltage can be derived, and this part of the output voltage is applied to said compensating circuit, said compensating circuit having a transfer function which corresponds at least approximately to a square root function.

6. A circuit arrangement as claimed in claim 1 including a speed sensitive device connected to said generator having a make contact, said make contact being connected in series with the field winding of the generator and closing when a minimum speed is exceeded.

References Cited

UNITED STATES PATENTS

| | | |
|---|---|---|
| Re. 12,908 | 1/1909 | Berry. |
| 1,041,252 | 10/1912 | Dougherty ---------- 128—2 X |
| 2,716,978 | 9/1955 | Torricelli ------------ 128—2 |
| 3,258,007 | 6/1966 | Karpovich et al. ------- 128—2 |

L. W. TRAPP, Primary Examiner

U.S. Cl. X.R.

272—73